(12) United States Patent
Green et al.

(10) Patent No.: US 8,318,849 B2
(45) Date of Patent: Nov. 27, 2012

(54) HIGH SOLIDS NONAQUEOUS DISPERSION CLEARCOATS

(75) Inventors: Marvin L. Green, Brighton, MI (US); Donald H. Campbell, Hartland, MI (US)

(73) Assignee: BASF Coatings GmbH, Münster (DE)

( * ) Notice: Subject to any disclaimer, the term of this patent is extended or adjusted under 35 U.S.C. 154(b) by 1765 days.

(21) Appl. No.: 11/379,615

(22) Filed: Apr. 21, 2006

(65) Prior Publication Data
US 2007/0249777 A1 Oct. 25, 2007

(51) Int. Cl.
*C08L 33/14* (2006.01)
*C08L 29/02* (2006.01)

(52) U.S. Cl. ........ 524/500; 525/535; 525/498; 525/157; 525/192; 525/218

(58) Field of Classification Search .................. 524/500; 525/535, 498, 157, 192, 218
See application file for complete search history.

(56) References Cited

U.S. PATENT DOCUMENTS

| | | | |
|---|---|---|---|
| 2,979,514 A | 4/1961 | O'Brien et al. | |
| 3,479,328 A | 11/1969 | Nordstrom | |
| 3,674,838 A | 7/1972 | Nordstrom | |
| 4,126,747 A | 11/1978 | Cowherd, III et al. | |
| 4,279,833 A | 7/1981 | Culbertson et al. | |
| 4,301,257 A | 11/1981 | Zengel et al. | |
| 4,340,497 A | 7/1982 | Knopf | |
| 4,758,632 A | 7/1988 | Parekh et al. | |
| 4,818,792 A | 4/1989 | Martin et al. | |
| 5,292,842 A * | 3/1994 | Yang | 526/318.4 |
| 5,593,785 A * | 1/1997 | Mayo et al. | 428/423.1 |
| 5,747,590 A * | 5/1998 | Corcoran et al. | 525/155 |
| 6,541,577 B2 * | 4/2003 | Ohrbom et al. | 525/498 |
| 6,858,693 B2 | 2/2005 | Campbell et al. | |
| 2004/0087728 A1 | 5/2004 | Campbell et al. | |
| 2004/0236034 A1 | 11/2004 | Ohrbom et al. | |
| 2005/0074617 A1 * | 4/2005 | Lin et al. | 428/447 |
| 2006/0045965 A1 * | 3/2006 | Lin | 427/162 |
| 2006/0047036 A1 * | 3/2006 | Lin | 524/261 |

FOREIGN PATENT DOCUMENTS

| | | |
|---|---|---|
| WO | 2003016414 A1 | 2/2003 |
| WO | WO 03016414 A1 * | 2/2003 |
| WO | 2003029319 A1 | 4/2003 |
| WO | WO 03029319 A1 * | 4/2003 |
| WO | 2005105938 A1 | 11/2005 |
| WO | WO 2005105938 A1 * | 11/2005 |

OTHER PUBLICATIONS

International Search Report and the Written Opinion of the International Searching Authorite for PCT/US2007/066683 Filed Apr. 16, 2004.

* cited by examiner

*Primary Examiner* — Satya Sastri
(74) *Attorney, Agent, or Firm* — Harness, Dickey & Pierce, P.L.C.

(57) ABSTRACT

A high solids, non-aqueous dispersion, clearcoat composition is disclosed, comprising a functional polymer selected from the group consisting of a) carbamate-functional polymers and b) hydroxyl-functional polymers; c) a curing agent selected from the group consisting of aminoplast resins and blocked polyisocyanates; and d) a weak non-polar solvent, wherein the coating is high solids, substantially clear and transparent, and further comprises a dispersed phase and a continuous phase.

19 Claims, No Drawings

HIGH SOLIDS NONAQUEOUS DISPERSION CLEARCOATS

FIELD OF THE DISCLOSURE

The present disclosure relates high solids, nonaqueous dispersion clearcoats.

BACKGROUND OF THE DISCLOSURE

The statements in this section merely provide background information related to the present disclosure and may not constitute prior art.

Due to regulation of volatile organic solvent emissions, there is a continuing desire to reduce the volatile organic content of coating compositions. Solvents, which may be expensive, evaporate during application and curing. Therefore, coatings known in the art as "high solids" are often used to limit the cost and amount of volatile solvents vented to the atmosphere.

A high solids level can result in an undesirable viscosity, limiting the methods of application. A high solids coating of suitable viscosity can sometimes be achieved through use of low molecular weight solution polymers. However, a problem associated with these high solids coatings is that at approximately a 50-60% solids level the coating can exhibit significant sagging. Industry generally requires a 2.5 mil topcoat thickness without sagging, and thixotropes are often added to achieve the required coating thickness without sagging. Thixotropes are a further added expense and can result in coatings having an undesirable appearance, for example lower gloss.

In contrast, the nonaqueous dispersion (NAD) approach to high solids clearcoats offers advantages over conventional solution based clearcoats A high solids coating can be achieved with a nonaqueous dispersion, while maintaining or increasing the molecular weight, because the polymers of the coating are in a dispersed phase. For instance, during application of the nonaqueous dispersion the viscosity is low because the polymer is in a dispersed phase. After application and solvent evaporation, there is a high viscosity since the molecular weight is not lowered. This high viscosity and the pseudoplastic character of the NAD provide resistance to sag. Thus, nonaqueous dispersions break the viscosity dichotomy required of good coatings, i.e., a low viscosity during application and a high viscosity after application.

Although nonaqueous dispersion resins generally show superior resistance to cratering and solvent pop, there remains an additional need to improve environmental etching and scratch and mar resistance. Environmental etching manifests as spots or mark on or in the clearcoat. The high degree of clarity exhibited by clearcoats generally makes it easier to observe such defects. General appearance and ease of repair also remain as a concern in the industry.

Accordingly, there is a persistent search for high solids clearcoat compositions that have excellent appearance, and improved durability, hardness, flexibility, sag resistance, crack and chip resistance, scratch and mar resistance, resistance to environmental etch, and ease of repair in comparison to conventional clearcoats.

SUMMARY OF THE DISCLOSURE

This disclosure is directed to a high solids nonaqueous dispersion clearcoat. The nonaqueous dispersion comprises a dispersed phase and a continuous phase. The clearcoat composition further includes a carbamate-functional polymer, a hydroxyl-functional polymer, a curing agent, and a weak non-polar solvent. The weak non-polar solvent is generally present as part of the continuous phase. The carbamate-functional and hydroxyl-functional polymers, although typically located in the dispersed phase, may instead or also be present in the continuous phase. Curing agents, for example aminoplast and blocked isocyanate curing agents, while generally located in the continuous phase, may also be situated within the dispersed phase.

The high solids, nonaqueous dispersions of the disclosure are substantially transparent white and are useful in clearcoat compositions. The coating compositions of the disclosure exhibit good resistance to sag and excellent etch resistance, appearance and durability. Thus, the composition is a significant advance in the field of clearcoat finishes.

Further areas of applicability will become apparent from the description provided herein. It should be understood that the description and specific examples are intended for purposes of illustration only and are not intended to limit the scope of the present invention.

DETAILED DESCRIPTION

The following description is merely exemplary in nature and is not intended to limit the present invention, application, or uses.

The high solids, nonaqueous dispersion clearcoat composition comprises a polar polymer, for example a carbamate-functional polymer and/or a hydroxyl-functional polymer, a curing agent reactive with the functional polymer or polymers, and a weak non-polar solvent.

The nonaqueous dispersions of the present disclosure comprise a dispersed phase that may include one or more functional polymers (hereinafter also referred to as polymer "particles"), the particles of the dispersed phase being stably dispersed in a continuous phase. The term "stable" means that the dispersed phase does not settle, agglomerate, or precipitate upon standing. The functional polymers of the nonaqueous dispersion of the disclosure are preferably polar. The polarity of the polymer is preferably sufficient to prevent the polymer from dissolving in the continuous phase solvent. Chemical compounds are generally polar when the centers of positive and negative charge distribution of the molecules do not converge. The term "polar" as used herein to describe polymers, solvents, or non-aqueous media means substances that contain polar groups such as carbamate groups, hydroxyl groups, carboxyl or other acid groups, carbonyl groups, ether groups, ester groups, amide groups, amino groups, halogenated hydrocarbon groups, nitrile groups, or other such polar groups. Conversely, the term "non-polar" describes substances that are essentially free of polar groups such as those mentioned above.

Any process known in the art for making nonaqueous dispersions may be used to form nonaqueous dispersions for the clearcoats of the disclosure. Nonaqueous dispersions may be acquired commercially, for example from Nuplex Resins. The polymers of the dispersed phase may also be prepared by non-aqueous dispersion polymerization of monomers carried out in a weak, nonpolar solvent. If the polymerization is carried out in the nonpolar solvent, it is not necessary transfer them to a different medium, although such a transfer is possible, e.g. by drying and redispersing. Any medium into which the dispersion of particles is transferred should be chosen such that it will form a stable dispersion and no flocculate or swell the polar particles. In other words, any solvent chosen must be such that it will not dissolve or swell the polar polymer particles.

The high solids nonaqueous dispersion clearcoats of the disclosure comprise at least two discrete phases, including a continuous phase and a dispersed phase. At least one functional polymer must be present within the dispersed phase of the nonaqueous dispersion. Preferably, the at least one functional polymer comprises a carbamate-functional polymer, a hydroxyl-functional polymer, or combinations thereof.

In a broad sense, the polymers of the disclosure, existing in either the dispersed or continuous phase, may be made by polymerization of one or more monomers. Polymerization of monomers may occur by any means known in the art, including addition polymerization or condensation polymerization. It is preferred that the monomers that are polymerized comprise ethylenically unsaturated monomers. Non-limiting examples of nonfunctional, ethylenically unsaturated monomers that may be used are the alkyl esters of acrylic acid, methacrylic acid, and/or crotonic acid such as methyl, ethyl, propyl, butyl, pentyl, hexyl, octyl, decyl, and dodecyl acrylates and methacrylates. Other examples include styrene, vinyl cyclohexane, vinyl cyclooctane, vinyl cyclohexene, hexanediol diacrylate, vinyl naphthalene, alpha-methylstyrene, and the like. The monomers that may be used include functional ethylenically unsaturated monomers, such as carbamate-functional or hydroxyl-functional acrylate and methacrylate monomers. As used herein, the term "functional ethylenically unsaturated monomers" refers to ethylenically unsaturated monomers which contain functional groups that are reactive with crosslinking agents, especially aminoplast resins such as melamine formaldehyde resins and/or blocked isocyanate functional crosslinking agents. Non-limiting examples of such reactive functional groups are pendant carbamate groups, both secondary and primary, and hydroxyl groups. Polar groups contained in the polymerized dispersed phase particles of the present disclosure preferably include polar functional groups such as carbamate groups, hydroxyl groups, or mixtures thereof.

Polymerization of monomers may include additional materials, for example polymerization initiators, such as free radical polymerization initiators, chain transfer agents, stabilizers, polymer dispersants, and surfactants. Useful free radical initiators well known in the art include azobis(2-methylbutyronitrile), dipropyl peroxide, di-t-butyl peroxide, cumene hydroperoxide, t-butyl perbenzoate, t-butyl peroctoate and the like. It should be appreciated that nonaqueous dispersion may also require a stabilizer or surfactant so that coagulation in the dispersed phase does not occur. Non-limiting examples of incorporated or internal stabilizers are aliphatic soluble melamine formaldehyde resins and the copolymerized reaction product of poly 12-hydroxystearic acid and glycidyl methacrylate, i.e. GMA-PHSA Dispersants may further be employed to provide stability to the particle dispersion, and can be prepared from a variety of monomers, including non-functional monomers or mixtures thereof.

The polymers of the disclosure include carbamate-functional polymers Compositions based on carbamate-functional resins have excellent durability, hardness, gloss, and appearance. Carbamate groups can react with aminoplast methylol groups to form urethane linkages, which are less susceptible to hydrolysis than ether linkages formed by reaction of hydroxyl groups with methylol groups. The carbamate-functional polymers of the disclosure may comprise a structure having a polymer backbone made via the polymerization of ethylenically unsaturated monomers, and as such will consist substantially of carbon-carbon linkages. Although the carbamate-functional polymers of the disclosure may be made by addition polymerization, it should be appreciated that the carbamate-functional polymers of the disclosure may also be made by condensation polymerization.

One or more acrylic monomers having a carbamate-functional group in the ester portion of the monomer may be used. The terms "carbamate group," "carbamate-functional," and the like, as used in connection with the present disclosure refer to a group having a structure:

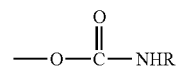

in which R is H or a hydrocarbyl group, preferably R is H or a hydrocarbyl group of from 1 to about 8 carbon atoms, more preferably R is H or a hydrocarbyl group of from 1 to about 4 carbon atoms, and yet more preferably R is H. When R is H, the carbamate group is referred to herein as a primary carbamate group. Such monomers are well known in the art and are described, for example in U.S. Pat. Nos. 3,479,328, 3,674, 838, 4,126,747, 4,279,833, and 4,340,497, and published U.S. Pat. Application No 2004/0087728, the disclosures of which are incorporated herein by reference.

One method of synthesis involves reaction of a hydroxyl ester with urea to form the carbamyloxy carboxylate, e.g. carbamate-modified acrylic. Another method of synthesis reacts an α,β-unsaturated acid or ester with a hydroxy carbamate ester to form the carbamyloxy carboxylate. Yet another technique involves formation of a hydroxyalkyl carbamate by reacting ammonia, a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well.

Acrylic monomers having a carbamate-functional group can be polymerized along with other ethylenically unsaturated monomers that may or may not have functional groups, if desired, by techniques well known in the art.

An alternative route for preparing the carbamate-functional polymer of the disclosure is to react an already-formed acrylic backbone polymer with another component to form a carbamate-functional group appended to the polymer backbone, as described in U.S. Pat. No. 4,758,632, the disclosure of which is incorporated herein by reference. One technique for preparing a carbamate-functional polymer involves thermally decomposing urea (to give off ammonia and HNCO) in the presence of a hydroxyl-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well known in the art and include unsaturated m-tetramethyl xylene isocyanate (sold by American Cyanamid under the trademark TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. Another way is to react a hydroxyalkyl carbamate with an anhydride backbone. Alternatively, a carboxy carbamate may be reacted with an epoxy acrylic. In fact any condensation reaction or combination thereof may used to carbamate or post extend the polymer backbone. A more difficult, but feasible way of preparing the polymer would be to trans-esterify an acrylate polymer with a hydroxyalkyl carbamate.

In a particular, non-limiting example, the carbamate-functional polymer has a carbamate equivalent weight of from 250 to 1500 g/mole. In another non-limiting example, the carbamate-functional polymer is an acrylic polymer having a carbamate equivalent weight of from 250 to 1500 g/mole.

The composition also may include a hydroxyl-functional polymer. Hydroxyl-functional polymers may be used to reduce brittleness of the coating composition. Preferably the hydroxyl-functional polymer of the disclosure is formed from copolymerization of hydroxyl-containing acrylate monomer, hydroxyl-containing methacrylate monomer or mixtures thereof. It is especially preferred that the hydroxyl-functional monomer comprises hydroxyethyl methacrylate.

The hydroxyl-functional polymers may also be made by combining a polyisocyanate compound with a reactive compound having more than one hydroxyl group, or at least two hydroxyl groups and one amino group. Generally, the reactive compound may have an excess of hydroxyl groups in comparison to the isocyanate groups on the polyisocyanate. It is known that amino groups react much faster than hydroxyl groups with isocyanates. Because the reaction of amine with isocyanate is much faster than that of hydroxyl, the predominant linkage formed in the reaction product will be ureas, and the unreacted hydroxyl groups become functional hydroxyl groups on the polymer. With a reactive compound having one amino group, two or more amino alcohols per diisocyanate may also be reacted to provide a monomeric hydroxyl-functional compound.

Hydroxyl-functional polymers may also comprise polyester polyol polymers. Polyester polyol polymers may be polymerized by esterification of a polyol and a diacid, e.g. a carboxylic acid. Specific examples of suitable polyols include ethylene glycol, 1,6-hexanediol, neopentyl glycol, and 2,2-dimethyl-3-hydroxypropionate. Other suitable glycols include hydrogenated bisphenol A, cyclohexanediol, cyclohexanedimethanol, caprolactone-based diols such as the reaction product of s-caprolactone and ethylene glycol, hydroxy-alkylated bisphenols, polyether glycols such as poly (oxytetramethylene)glycol, mixtures thereof and the like.

Although the polyol component of the hydroxyl-functional polymer may be comprised only of diols, polyols of higher functionality may also be used. In one exemplary embodiment, the polyol component used to make the polymer will be a mixture comprising at least one diol and at least one polyol of higher functionality, such as a triol. Examples of polyols of higher functionality would include trimethylolethane, trimethylolpropane, pentaerythritol, and the like. Limited amounts of monofunctional alcohols, such as ethylhexanol, may also be used.

In a particular non-limiting example, the hydroxyl-functional polymer of the disclosure has a hydroxyl equivalent weight of from 250 to 1500 g/equivalent. In another non-limiting example, the hydroxyl-functional polymer is an acrylic polymer having a hydroxyl equivalent weight of from 250 to 1500 g/equivalent.

It should be further appreciated that the functional polymers present in the dispersed phase of the non-aqueous dispersion clearcoats of the disclosure may exhibit molecular weights that are higher than are available with conventional high solids solution polymer coatings. The number average molecular weight ($M_n$) of the polymers of the disclosure is preferably 6,000 to 100,000 Daltons, more preferably 10,000 to 25,000 Daltons, and most preferably 20,000 to 22,000 Daltons. The higher molecular weight provides for excellent sag resistance and improved appearance (less cratering and solvent pop) in comparison to conventional clearcoats. Furthermore, a higher molecular weight backbone increases the exposure durability of the coating, as well as strike-in resistance.

Additional nonfunctional polymers may be included in the composition of the disclosure. Non-limiting examples are polymers produced by polymerization of any combination of ethyl (meth)acrylate, 2-ethylhexylacrylate, butyl (meth)acrylate, isobutyl acrylate, hydroxy ethyl(meth)acrylate, and (meth)acrylic acid.

In order to provide for crosslinking, at least one curing agent or crosslinking agent may be included with the monomers during polymerization, or is added to the nonaqueous dispersion after polymerization. If the curing agent is to be in the continuous phase, generally an aliphatic or aromatic non-polar solvent, the curing agent must also be soluble in the solvent. When a crosslinker is thus incorporated into the coating, the crosslinker type and level are usually chosen based on the functional groups present in the dispersed phase particles.

Curing agents will comprise at least two functional groups that are reactive with functional groups of the polymers in the dispersed and continuous phases. The disclosed coating compositions may comprise one or more crosslinking agents, wherein same or different functional groups may be on the same or different crosslinking agents.

Illustrative examples of suitable curing agents are those crosslinking agents having functional groups that include, for example and without limitation, active methylol or methylalkoxy (found on aminoplast (melaminelaldehyde or phenol/formaldehyde adducts)), hydroxyl, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Preferred crosslinking agents will have crosslinkable functional groups that are reactive with hydroxyl-functional groups and carbamate groups.

Blocked isocyanates (including isocyanurates) and/or aminoplasts such as melamine/aldehyde aminoplast resins are most preferred for use as crosslinking agents in the nonaqueous dispersion clearcoat compositions of the disclosure. Blocked isocyanate compounds are known in the art and typically used in thermosetting coating compositions when it desired that the isocyanate group be unreactive with the isocyanate-reactive components of the coating composition until the composition is heated to a temperature at which the blocking agent compound unblocks.

Aminoplast compounds are obtained from the reaction of an aldehyde such as formaldehyde with an amine or amide. The most common amines are melamine, urea, and benzoguanamine, with melamine preferred. However, condensates with other amines can be used. While the aldehyde used is most often formaldehyde, other aldehydes such as acetaldehyde, crotonaldehyde, and benzaldehyde may be used.

The weak non-polar solvent of the nonaqueous dispersion may include one or more weak, nonpolar solvents, such as aliphatic and aromatic solvents, with non-oxygenated solvents preferred. The solvation strength of a solvent is characterized by a solvent's solubility parameter Per ASTM D-3132, the solubility parameter of a solvent is defined as the square root of the cohesive energy density, or energy of vaporization, per unit volume. In the coatings industry, it should be understood that the Hansen system is generally used to indicate solubility. This system defines three solubility parameters related to an overall solubility parameter $\delta$, by the equation: $\delta=\sqrt{(\delta_D^2+\delta_P^2+\delta_H^2)}$, where $\delta_D$ is the dispersive or "nonpolar" parameter, $\delta_P$ is the polar parameter, and $\delta_H$ is the hydrogen bonding parameter. The term "weak" as used in the instant disclosure means that a solvent has a solubility parameter $\delta$ of less than 10 hildebrand or $\sqrt{(calories/cm^3)}$, and preferably less than 9 hildebrand.

Nonlimiting examples of weak, nonpolar solvents include Varnish Makers & Painters (VM&P) Naphtha™ (a distillation cut from petroleum distillates), mineral spirits, Isopar™ I, G, H, and K, Varsol™ solvents, Stoddard™ solvent, hexane and heptane. It is conventional in this art to add modifier solvents and diluents such as aromatics, esters or ketones to these solvents to provide desired qualities such as the proper solubility and evaporation characteristics.

Further examples of solvents which may exist as a continuous phase in a nonaqueous dispersion are ester or ketone solvents or mixtures thereof; specifically ethyl acetate or mixtures of ethyl acetate and other suitable ester solvents, n-butyl acetate, n-hexyl acetate, n-pentyl proprionate, Exxate 800 or 1000 and the like, and mixtures thereof; ethers such as monoethyl, monobutyl and monohexyl ethers of propylene glycol, and the like; ketone solvents such as methyl ethyl ketone, methyl isobutyl ketone, methyl propyl ketone, diisobutyl ketone and the like, and mixture thereof; mixtures of ester and ketone solvents; and aromatic hydrocarbons such as toluene, xylene, Solvesso SC-100, Solvesso SC-150 and the like, and mixtures thereof.

The continuous phase may also include functional or nonfunctional polymers. At least one curing agent, wherein the curing agent is preferably an aminoplast resin, blocked polyisocyanate, or a combination thereof, may exist in either phase. Particularly, blocked isocyanate may be included in the dispersed phase. In a preferred embodiment, a curing agent exists in the continuous phase.

The coating compositions of the disclosure may further comprise additional additives and components such as leveling agents, flow modifiers, acid catalysts, adhesion modifiers, UV absorbers, HALS compounds, antioxidants, wetting agents, plasticizers, and the like, in one or both phases. It should be appreciated that suitable additives or components should not significantly affect the clear and transparent nature of the coating compositions of the disclosure after cure.

The polar polymeric particles of the present disclosure may be colloidal dimensions, that is, from about 0.01 to about 2 microns (100 to 20,000 Angstroms) in diameter, preferably from about 0.05 to about 0.5 microns (500 to 5000 Angstroms) in diameter, on average. The particle size may be measured by conventional and well known light scattering or other techniques.

The high solids dispersions of the disclosure are typically prepared such that the solids content is greater than 57% by weight, more preferably greater than 62% by weight, and most preferably 67% by weight or greater. In an exemplary example, the high solids coatings of the disclosure were observed to have approximately 67% by weight solids, equating to approximately 2.75 pounds volatile per gallon coating, while still exhibiting excellent processing and performance characteristics. It is an important feature of the disclosure that the high solids content of the coating is achieved while a viscosity suitable for application, for example by spraying, is maintained.

The clearcoat compositions of the present disclosure are substantially clear and transparent, and are particularly suitable for use as automotive coating compositions. For example, the coating composition of the disclosure may be used as an automotive clearcoat coating applied over a layer of electrocoat primer, primer surfacer, and/or basecoat.

The coating compositions of this disclosure can be applied to an article by any of a number of techniques well known in the art. These include, for example, spray coating, dip coating, roll coating, curtain coating, and the like. For articles such as automotive body panels, spray coating is preferred. With the high solids nonaqueous dispersion coatings of the disclosure, higher molecular weight polymers may be spray coated, and sag resistance of the resulting coatings are excellent.

Articles which may be coated with compositions of the disclosure may be plastic, metal, wood, and combinations thereof, with plastics and metal being preferred, and metals such as steel, aluminum and the like being most preferred. Such substrates may be coated or uncoated, treated or untreated, and combinations thereof. Most preferably, the articles or substrates to be coated with the composition of the disclosure will be primed or electrocoated, and preferably overcoated with a basecoat layer.

After an article is coated with one or more applications of the coating composition of the disclosure, it is subjected to conditions so as to cure the applied coating. Although various methods of curing may be used, heat-curing is preferred. Generally, heat curing is effected by exposing the coated article to elevated temperatures provided primarily by radiative heat sources. Curing temperatures will vary depending on the particular blocking groups used in the curing agents. However, curing temperatures generally range between 93° C. and 177° C., and are preferably between 121° C. and 141° C. The curing time will vary depending on the particular components used, and physical parameters such as the thickness of the coating. Typical curing times may range from approximately 15 to approximately 60 minutes.

The preferred crosslinks arising from curing the high solids nonaqueous dispersion clearcoats of the disclosure are urethane crosslinks. Particularly, urethane crosslinks are formed via reaction of carbamate-functional polymers with melamince crosslinkers, and/or hydroxyl-functional polymers with blocked isocyanate crosslinkers. The amount of urethane crosslinks is preferably greater than 0 percent, more preferably greater than 15 percent, and most preferably greater than 30 percent of the crosslinks formed during curing of the high solids nonaqueous dispersion clearcoats of the disclosure.

The following examples are illustrative of the claimed invention, but are not intended to limit the scope of the invention.

EXAMPLES

Coating compositions according to the disclosure were prepared by combining the materials in order as set forth below in Table 1, and mixing under agitation. All parts listed are by weight, unless stated otherwise.

TABLE 1

| INGREDIENT | EXAMPLE 1 | EXAMPLE 2 | EXAMPLE 3 |
|---|---|---|---|
| Acrylic NAD Resin[1] | 93.52 | 68.32 | 81.94 |
| HS Acrylic Resin[2] | 8.31 | 0.00 | 0.00 |
| Carbamated Dimer Fatty Alcohol Resin[3] | 0.00 | 18.22 | 0.00 |
| HS Acrylic Resin[4] | 0.00 | 0.00 | 17.03 |
| Melamine[5] | 29.10 | 20.56 | 30.07 |

TABLE 1-continued

| INGREDIENT | EXAMPLE 1 | EXAMPLE 2 | EXAMPLE 3 |
|---|---|---|---|
| Blocked NCO Resin[6] | 0.00 | 27.03 | 0.00 |
| SC-150[7] | 12.26 | 18.54 | 21.16 |
| TOTAL | 149.25 | 158.73 | 156.25 |

[1]USPD-428-36 hydroxyl functional acrylic NAD in VM&P Naphtha from Nuplex
[2]USPD-428-34 carbamate functional acrylic solution resin from Nuplex
[3]Carbamate functional resin made from dimer fatty alcohol from BASF
[4]USPD-414-48 hydroxyl functional acrylic resin from Nuplex
[5]Cymel 1135 available from Cytec
[6]Desmodur TP LS 2253 blocked polyisocyanate from Bayer
[7]Solvesso 150 available from Exxon Chemical The curable coating compositions of the Examples were evaluated per the following. The control was R10CG060D, a conventional high solids carbamate acrylic—melamine system available from BASF Corporation of Southfield, Mich. For testing, the compositions were cured at 275° F. for 25 minutes All of the Examples exhibited acceptable scratch and mar resistance. The results set forth below in Table 2 show the compositions of Examples 1, 2, and 3 had equivalent or lower viscosity, while exhibiting a reduced VOC and improved sag resistance and pop resistance A particular result of interest was the significantly improved sag resistance exhibited by the Examples Environmental etch resistance was also observed to be improved, with a value of 1 being the best, for Example 1.

TABLE 2

| TEST | CONTROL | EXAMPLE 1 | EXAMPLE 2 | EXAMPLE 3 |
|---|---|---|---|---|
| Viscosity (Brookfield @ 25 C.) | 129 cps | 87.6 cps | 124.4 cps | 119 cps |
| Weight Non-Volatiles | 53.6 | 67.0 | 63.0 | 64.0 |
| Density (Weight per Gallon) | 8.36 | 8.34 | 8.30 | 8.33 |
| VOC (Pounds per Gallon) | 3.88 | 2.75 | 3.07 | 3.00 |
| Gloss (20 Degree Meter) | 89 | 90 | 85 | 88 |
| Knoop Hardness | 11.8 | 11.3 | 11.4 | 8.7 |
| QCT Humidity (16 HR @ 140f F.) | no effect | no effect | no effect | no effect |
| Pop Resistance (TS-092) | 2.1 mil | 2.4 mil | 2.4 mil | 2.3 mil |
| Sag Resistance (TS-092) | 1.8 mil | 2.4+ mil | 2.4+ mil | 2.4+ mil |
| Environmental Etch | 7 | 6 | — | — |

Thus, the disclosed high solids nonaqueous dispersion clearcoat achieves a balance of properties such as high percent solids, ease of application, significantly reduced sagging, durability and resistance to environmental etch, and excellent finished appearance. The coatings of the disclosure provide a significant advance to the field of automotive clearcoats.

The disclosure has been described in detail with reference to preferred embodiments. It should be understood, however, that variations and modifications can be made within the spirit and scope of the disclosure.

What is claimed is:

1. A high solids, non-aqueous dispersion, clearcoat coating composition comprising
    a) a carbamate-functional polymer;
    b) a hydroxyl-functional polymer;
    c) a curing agent selected from the group consisting of aminoplast resins and blocked polyisocyanates; and
    d) a continuous phase solvent consisting essentially of a weak, non-polar solvent or a combination of weak, non-polar solvents;
    wherein the coating comprises a dispersed phase and a continuous phase, wherein the dispersed phase comprises a dispersed polymer selected from the group consisting of the carbamate-functional polymer, the hydroxyl-functional polymer, and combinations thereof, wherein the dispersed polymer has a number average molecular weight between 6,000 and 100,000 Daltons and a polarity that prevents dissolution in the continuous phase solvent.

2. The clearcoat composition according to claim 1, said continuous phase further comprising the curing agent.

3. The clearcoat composition according to claim 2, wherein the carbamate-functional polymer is present in the dispersed phase, and the hydroxyl-functional polymer is present in the continuous phase.

4. The clearcoat composition according to claim 2, wherein the carbamate-functional polymer and the hydroxyl-functional polymer are present in the dispersed phase.

5. The clearcoat composition according to claim 4, further comprising a hydroxyl-functional polymer present in the continuous phase.

6. The clearcoat composition according to claim 2, wherein the hydroxyl-functional polymer is present in the dispersed phase, and the carbamate-functional polymer is present in the continuous phase.

7. The clearcoat composition according to claim 2, wherein the polymer the dispersed polymer has a number average molecular weight between 10,000 and 25,000 Daltons.

8. The clearcoat composition according to claim 1, wherein the curing agent comprises a melamine resin soluble in the weak, non-polar solvent.

9. The clearcoat composition according to claim 1, having a volatile organic content less than 3.2 pounds of volatile organic solvent per gallon of coating composition.

10. The clearcoat composition according to claim 1, having a volatile organic content less than 3.0 pounds of volatile organic solvent per gallon of coating composition.

11. The clearcoat composition according to claim 1, wherein the weak, non-polar solvent comprises a distillation cut from petroleum distillates.

12. The clearcoat composition according to claim 1, wherein the clearcoat composition has a solids content of at least about 57 percent by weight.

13. A high solids, non-aqueous dispersion, clearcoat composition comprising
    a) a first carbamate-functional polymer;
    b) a second carbamate-functional polymer;
    c) a curing agent selected from the group consisting of aminoplast resins and blocked polyisocyanates; and
    d) a continuous phase solvent consisting essentially of a weak, non-polar solvent or a combination of weak, non polar solvents;
    wherein the coating comprises a dispersed phase comprising the first carbamate polymer, wherein the first carbamate polymer has a number average molecular weight between 6,000 and 100,000 Daltons and a polarity that prevents dissolution in the continuous phase solvent, said dispersed phase dispersed in a continuous phase, said continuous phase comprising the curing agent, the second carbamate-functional polymer, and the continuous phase solvent.

14. A high solids, non-aqueous dispersion, clearcoat composition comprising
   a) a curing agent selected from the group consisting of aminoplast resins and blocked polyisocyanates;
   b) a continuous phase solvent consisting essentially of a weak, non-polar solvent or a combination of weak, non-polar solvents; and
   c) a polymer reactive with the curing agent;
   wherein the coating comprises a dispersed phase comprising the curing agent and the polymer, wherein the polymer has a number average molecular weight between 6,000 and 100,000 Daltons and a polarity that prevents dissolution in the continuous phase solvent, said dispersed phase dispersed in a continuous phase, said continuous phase comprising the continuous phase solvent.

15. The high solids, non-aqueous dispersion, clearcoat composition according to claim 14, wherein the polymer comprises a carbamate-functional polymer.

16. The high solids, non-aqueous dispersion, clearcoat composition according to claim 15, wherein the dispersed phase further comprises a hydroxyl-functional polymer.

17. The high solids, non-aqueous dispersion, clearcoat composition according to claim 14, wherein the polymer comprises a hydroxyl-functional polymer.

18. A high solids, non-aqueous dispersion, clearcoat composition comprising
   a) a dispersed phase comprising a hydroxyl-functional polymer, wherein the hydroxyl-functional polymer has a number average molecular weight between 6,000 and 100,000 Daltons and a polarity that prevents dissolution in the continuous phase solvent; and
   b) a continuous phase comprising a blocked polyisocyanate curing agent and a continuous phase solvent consisting essentially of a weak, non-polar solvent or a combination of weak, non-polar solvents.

19. The clearcoat composition according to claim 1, said dispersed phase further comprising the curing agent.

* * * * *